United States Patent
Clifford et al.

(10) Patent No.: US 9,797,187 B2
(45) Date of Patent: Oct. 24, 2017

(54) DEVICES FOR MODULATION OF TEMPERATURE AND LIGHT BASED ON PHASE CHANGE MATERIALS

(71) Applicant: CARNEGIE MELLON UNIVERSITY, Center for Technology Transfer and Enterprise Creation, Pittsburgh, PA (US)

(72) Inventors: Dale Timothy Clifford, Pittsburgh, PA (US); Shi-Chune Yao, Pittsburgh, PA (US)

(73) Assignee: Carnegie Mellon University, a Pennsylvania Non-Profit Corporation, Pittsburgh, PA (US)

( * ) Notice: Subject to any disclaimer, the term of this patent is extended or adjusted under 35 U.S.C. 154(b) by 767 days.

(21) Appl. No.: 14/155,034

(22) Filed: Jan. 14, 2014

(65) Prior Publication Data
US 2014/0196868 A1    Jul. 17, 2014

Related U.S. Application Data

(60) Provisional application No. 61/848,901, filed on Jan. 14, 2013.

(51) Int. Cl.
*F28D 17/00*    (2006.01)
*E06B 9/24*    (2006.01)
(Continued)

(52) U.S. Cl.
CPC .............. *E06B 9/24* (2013.01); *F21S 11/007* (2013.01); *F28D 20/02* (2013.01); *F28D 20/026* (2013.01);
(Continued)

(58) Field of Classification Search
CPC . E06B 9/24; F21S 11/007; F28F 13/00; F28F 13/06; F28F 2200/00; F28D 20/02; F28D 20/026
(Continued)

(56) References Cited

U.S. PATENT DOCUMENTS 3,112,184 A * 11/1963 Hollenbach ............. B28B 1/002
156/197
3,235,240 A *  2/1966 Seacrest .................... C21B 9/06
165/9.1

(Continued)

FOREIGN PATENT DOCUMENTS

DE    102004025996 A1    10/2005

*Primary Examiner* — Ljiljana Ciric
(74) *Attorney, Agent, or Firm* — Michael G. Monyok; David G. Oberdick

(57) ABSTRACT

Devices that incorporate phase change materials in containment vessels promote conduction of thermal energy between the phase change materials within the containment vessels and the surrounding air. In some embodiments, the containment vessels are transparent to enable visual awareness of the operation and functionality of the PCMs. In some embodiments, the containment vessels are design to passively promote air flow across the surfaces of the containment vessels. In some embodiments, the containment vessels include embedded structures to promote the conduction of thermal energy to and from the interior of the containment vessel. In some of these embodiments, the intent is to target the location of crystal 'seeds' and control crystal growth, thus gaining greater control over thermal transfer.

13 Claims, 13 Drawing Sheets

(51) Int. Cl.
   *F21S 11/00* (2006.01)
   *F28F 13/00* (2006.01)
   *F28F 13/06* (2006.01)
   *F28D 20/02* (2006.01)

(52) U.S. Cl.
   CPC ............ *F28F 13/00* (2013.01); *F28F 13/06* (2013.01); *E06B 2009/2417* (2013.01); *F28F 2200/00* (2013.01); *Y02E 60/145* (2013.01)

(58) Field of Classification Search
   USPC ........................................ 165/4–10; 126/400
   See application file for complete search history.

(56) References Cited

U.S. PATENT DOCUMENTS

| | | | | |
|---|---|---|---|---|
| 3,251,403 A * | 5/1966 | Smith | F28D 19/04 | 156/89.22 |
| 3,363,478 A * | 1/1968 | Lanning | F28D 19/048 | 165/10 |
| 3,416,509 A * | 12/1968 | Huebler | F24C 14/025 | 126/21 A |
| 3,430,687 A * | 3/1969 | Wardale | F28D 19/048 | 165/10 |
| 3,482,622 A * | 12/1969 | Bracken, Jr. | F28D 19/042 | 165/10 |
| 3,641,763 A * | 2/1972 | Cole | F02C 7/105 | 165/10 |
| 3,688,835 A * | 9/1972 | Yamaguchi | F28D 19/048 | 165/10 |
| 3,720,198 A * | 3/1973 | Laing | C09K 5/06 | 126/400 |
| 3,771,592 A * | 11/1973 | Sayers | C03B 23/207 | 165/10 |
| 3,773,484 A * | 11/1973 | Gray, Jr. | C03B 23/207 | 165/10 |
| 3,885,942 A * | 5/1975 | Moore | C03B 23/207 | 165/10 |
| 3,889,742 A * | 6/1975 | Rush | F24D 11/007 | 126/616 |
| 3,902,474 A * | 9/1975 | Pyle | F24J 2/04 | 126/400 |
| 3,923,667 A * | 12/1975 | Lachman | C04B 35/01 | 165/9 |
| 3,948,317 A * | 4/1976 | Moore | C03B 23/207 | 165/10 |
| 3,952,947 A * | 4/1976 | Saunders | F24F 5/0046 | 126/400 |
| 3,960,205 A | 6/1976 | Laing | | |
| 3,987,786 A * | 10/1976 | Keyes | F24F 5/0046 | 126/400 |
| 3,996,919 A * | 12/1976 | Hepp | F24J 2/04 | 126/400 |
| 4,000,851 A * | 1/1977 | Heilemann | F24D 11/003 | 126/400 |
| 4,014,380 A * | 3/1977 | Rush | F24F 3/1423 | 165/236 |
| 4,020,896 A * | 5/1977 | Mold | C03B 23/207 | 165/10 |
| 4,037,583 A * | 7/1977 | Bakun | F24J 2/202 | 126/400 |
| 4,064,867 A * | 12/1977 | Schlesinger | F24F 5/0046 | 126/400 |
| 4,073,284 A * | 2/1978 | Laing | F24J 2/045 | 126/400 |
| 4,111,189 A * | 9/1978 | Dizon | C09K 5/063 | 126/400 |
| 4,113,004 A * | 9/1978 | Rush | F24F 3/1423 | 126/609 |
| 4,147,300 A * | 4/1979 | Milburn, Jr. | F24D 11/007 | 126/400 |
| 4,172,442 A * | 10/1979 | Boblitz | F24J 2/0477 | 126/400 |
| 4,186,721 A * | 2/1980 | Whitman | F24J 2/26 | 126/400 |
| 4,187,831 A * | 2/1980 | Eubank | F24D 11/003 | 126/400 |
| 4,202,660 A * | 5/1980 | Pei | B01D 39/2017 | 165/10 |
| 4,212,289 A | 7/1980 | Hebert | | |
| 4,223,666 A * | 9/1980 | Wasserman | F24J 2/0444 | 126/400 |
| 4,232,731 A | 11/1980 | Kaplow et al. | | |
| 4,248,297 A * | 2/1981 | Pei | C03B 23/207 | 165/10 |
| 4,256,172 A * | 3/1981 | Rahnke | F28D 19/042 | 165/10 |
| 4,268,558 A * | 5/1981 | Boardman | F24C 15/34 | 126/400 |
| 4,270,512 A * | 6/1981 | Van Der Maas | F24B 1/18 | 126/400 |
| 4,330,028 A * | 5/1982 | Pujari | F28D 19/047 | 165/10 |
| 4,333,518 A * | 6/1982 | Frost | F28D 19/042 | 156/290 |
| 4,335,706 A * | 6/1982 | Passarelli | F24J 2/14 | 126/400 |
| 4,335,783 A * | 6/1982 | McBrayer | F28D 19/042 | 156/291 |
| 4,337,754 A | 7/1982 | Conger | | |
| 4,340,032 A * | 7/1982 | Smith | F24J 2/06 | 126/400 |
| 4,353,410 A * | 10/1982 | Godard | F24D 19/1042 | 126/400 |
| 4,381,815 A * | 5/1983 | Frost | F28D 19/042 | 156/304.1 |
| 4,398,590 A * | 8/1983 | Leroy | F23L 15/02 | 165/10 |
| 4,405,010 A * | 9/1983 | Schwartz | F28D 20/0056 | 165/10 |
| 4,461,276 A * | 7/1984 | Yogev | F28D 20/0043 | 126/400 |
| 4,469,088 A * | 9/1984 | Anzai | F24J 2/07 | 126/400 |
| 4,489,774 A * | 12/1984 | Ogawa | F28D 19/042 | 165/10 |
| 4,532,917 A | 8/1985 | Taff et al. | | |
| 4,556,047 A * | 12/1985 | Clavier | F24J 2/02 | 126/400 |
| 4,569,389 A * | 2/1986 | Graham, Jr. | B01J 19/121 | 126/400 |
| 4,590,993 A * | 5/1986 | Kurzweg | F03G 7/002 | 165/10 |
| 4,645,700 A * | 2/1987 | Matsuhisa | B28B 3/269 | 165/10 |
| 4,877,670 A * | 10/1989 | Hamanaka | B01J 21/14 | 165/10 |
| 4,911,227 A * | 3/1990 | Saito | F28D 19/042 | 165/10 |
| 4,982,722 A * | 1/1991 | Wyatt | A47J 36/2494 | 126/246 |
| 4,993,481 A * | 2/1991 | Kamimoto | C04B 38/0006 | 126/643 |
| 5,259,444 A * | 11/1993 | Wilson | F28D 19/04 | 165/10 |
| 5,305,821 A * | 4/1994 | Weingartner | F28D 20/023 | 126/400 |
| 5,339,653 A * | 8/1994 | DeGregoria | A62B 9/003 | 165/10 |
| 5,617,913 A * | 4/1997 | DeGregoria | A61M 16/1045 | 128/201.13 |
| 5,771,707 A * | 6/1998 | Lagace | F24F 3/1423 | 165/8 |
| 5,943,877 A * | 8/1999 | Chen | B64G 1/22 | 165/10 |
| 5,944,504 A * | 8/1999 | Tanaka | F23L 15/02 | 165/10 |
| 5,992,504 A * | 11/1999 | Kumazawa | F28F 21/04 | 165/10 |

(56) References Cited

U.S. PATENT DOCUMENTS

| | | | | |
|---|---|---|---|---|
| 6,062,297 | A * | 5/2000 | Kasai | F28F 21/04 165/9.1 |
| 6,105,659 | A * | 8/2000 | Pocol | B60H 1/00478 165/10 |
| 6,210,645 | B1 * | 4/2001 | Kumazawa | F28D 17/02 165/9.2 |
| 6,581,589 | B1 * | 6/2003 | Fent | F24J 2/0444 126/400 |
| 7,035,532 | B2 * | 4/2006 | Kudo | F24H 7/0408 165/10 |
| 7,698,906 | B2 * | 4/2010 | Jarvis | F24F 5/0035 165/4 |
| 8,016,022 | B2 * | 9/2011 | Richason | F28D 20/028 165/10 |
| 8,082,916 | B2 * | 12/2011 | Colson | E04C 1/42 126/400 |
| 8,425,660 | B2 * | 4/2013 | Ike | B01D 53/261 165/59 |
| 8,960,181 | B2 * | 2/2015 | Lin | F24J 2/02 126/400 |
| 9,027,633 | B2 * | 5/2015 | Khodadadi | B82Y 30/00 165/10 |
| 9,035,222 | B2 * | 5/2015 | Alexander | 165/58 |
| 2002/0070002 | A1 * | 6/2002 | Ohgami | F24F 3/1423 165/10 |
| 2004/0167499 | A1 * | 8/2004 | Grove | A61B 18/203 606/9 |
| 2004/0193235 | A1 * | 9/2004 | Altshuler | A46B 15/0002 607/88 |
| 2005/0134507 | A1 * | 6/2005 | Dishongh | H01L 23/3677 343/700 MS |
| 2005/0247226 | A1 * | 11/2005 | Langlais, II | B41C 1/1016 101/467 |
| 2006/0194164 | A1 * | 8/2006 | Altshuler | A46B 9/04 433/29 |
| 2008/0164265 | A1 * | 7/2008 | Conforti | B65D 81/3823 220/592.2 |
| 2008/0209907 | A1 * | 9/2008 | Xiao | F02C 1/05 60/641.15 |
| 2008/0210893 | A1 * | 9/2008 | McCarthy | G02B 5/223 250/517.1 |
| 2009/0014056 | A1 * | 1/2009 | Hockaday | H01L 31/035281 136/247 |
| 2009/0126898 | A1 * | 5/2009 | Eplee | B01D 53/261 165/10 |
| 2009/0197117 | A1 * | 8/2009 | Sasa | G11B 7/24035 428/698 |
| 2009/0204109 | A1 * | 8/2009 | Grove | A61B 18/203 606/9 |
| 2009/0250189 | A1 * | 10/2009 | Soukhojak | C09K 5/063 165/10 |
| 2009/0286036 | A1 * | 11/2009 | Sekiguchi | G11B 7/24038 428/64.4 |
| 2009/0293862 | A1 * | 12/2009 | Bailey | F24D 3/105 126/617 |
| 2009/0316537 | A1 * | 12/2009 | Nakatani | B82Y 10/00 369/44.14 |
| 2010/0050751 | A1 * | 3/2010 | Lee | G01N 35/00029 73/64.56 |
| 2010/0054100 | A1 * | 3/2010 | Deguchi | G11B 7/26 369/84 |
| 2010/0225989 | A1 | 9/2010 | Anders | |
| 2010/0316821 | A1 * | 12/2010 | Chang | B29C 47/065 428/35.8 |
| 2011/0003279 | A1 * | 1/2011 | Patel | G01D 3/10 435/5 |
| 2011/0036537 | A1 * | 2/2011 | Seki | C09K 5/063 165/10 |
| 2011/0149372 | A1 * | 6/2011 | Liu | C09K 9/02 359/288 |
| 2012/0010603 | A1 * | 1/2012 | Milner | A61B 5/0053 606/13 |
| 2012/0037148 | A1 * | 2/2012 | Tudor | F28D 20/02 126/400 |
| 2012/0261703 | A1 * | 10/2012 | Zimmerman | H01L 33/502 257/98 |
| 2012/0320298 | A1 * | 12/2012 | Suzuki | G02F 1/133553 349/43 |
| 2013/0228308 | A1 | 9/2013 | Abhari | |
| 2013/0264546 | A1 * | 10/2013 | Yu | H01L 51/5262 257/40 |
| 2014/0177029 | A1 * | 6/2014 | Liu | G02F 1/0147 359/288 |
| 2014/0225132 | A1 * | 8/2014 | Livesay | H01L 33/641 257/88 |
| 2014/0263278 | A1 * | 9/2014 | Zakhidov | F24J 2/485 219/472 |
| 2014/0305900 | A1 * | 10/2014 | Rogers | H05K 13/0023 216/13 |
| 2014/0346442 | A1 * | 11/2014 | Nag | H01L 29/0665 257/29 |
| 2017/0042373 | A1 * | 2/2017 | Alexander | A47J 36/2472 |

* cited by examiner

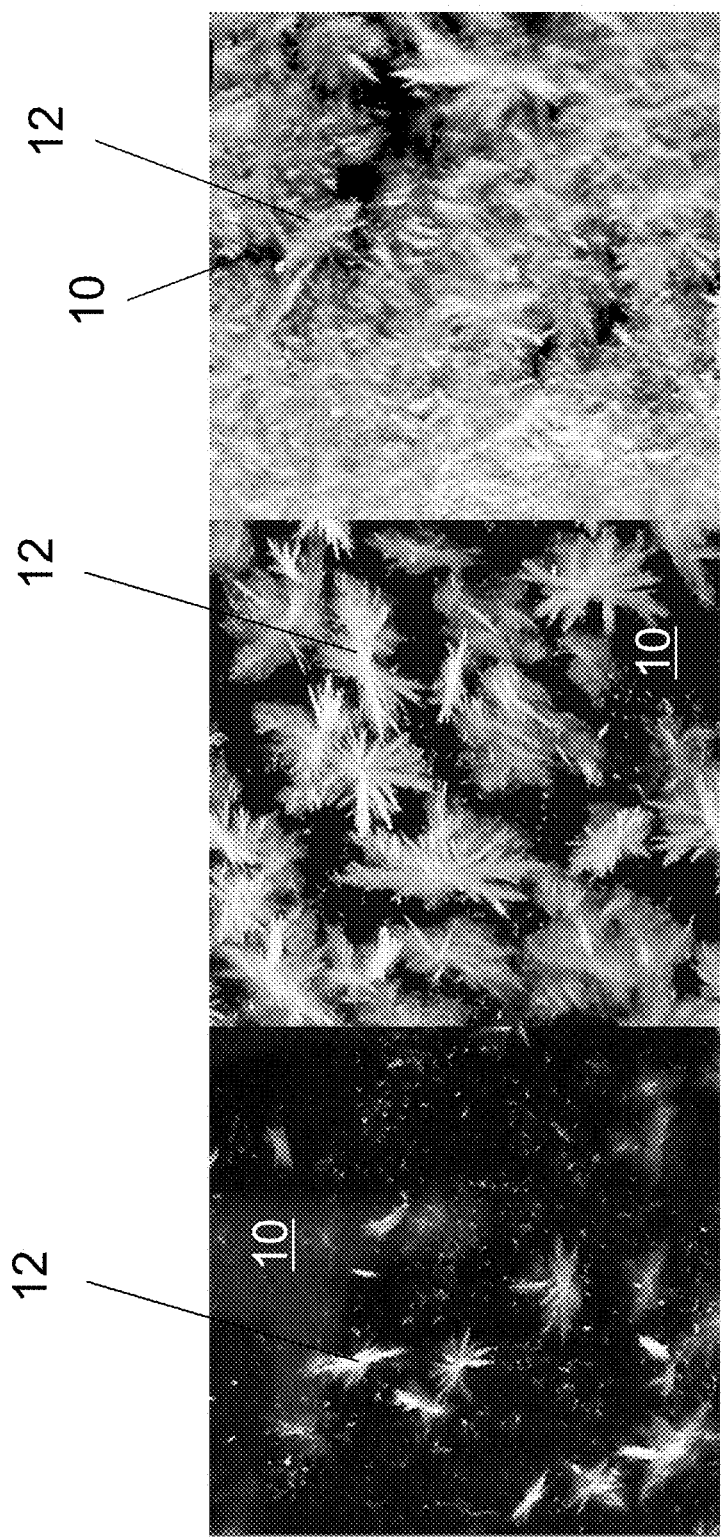

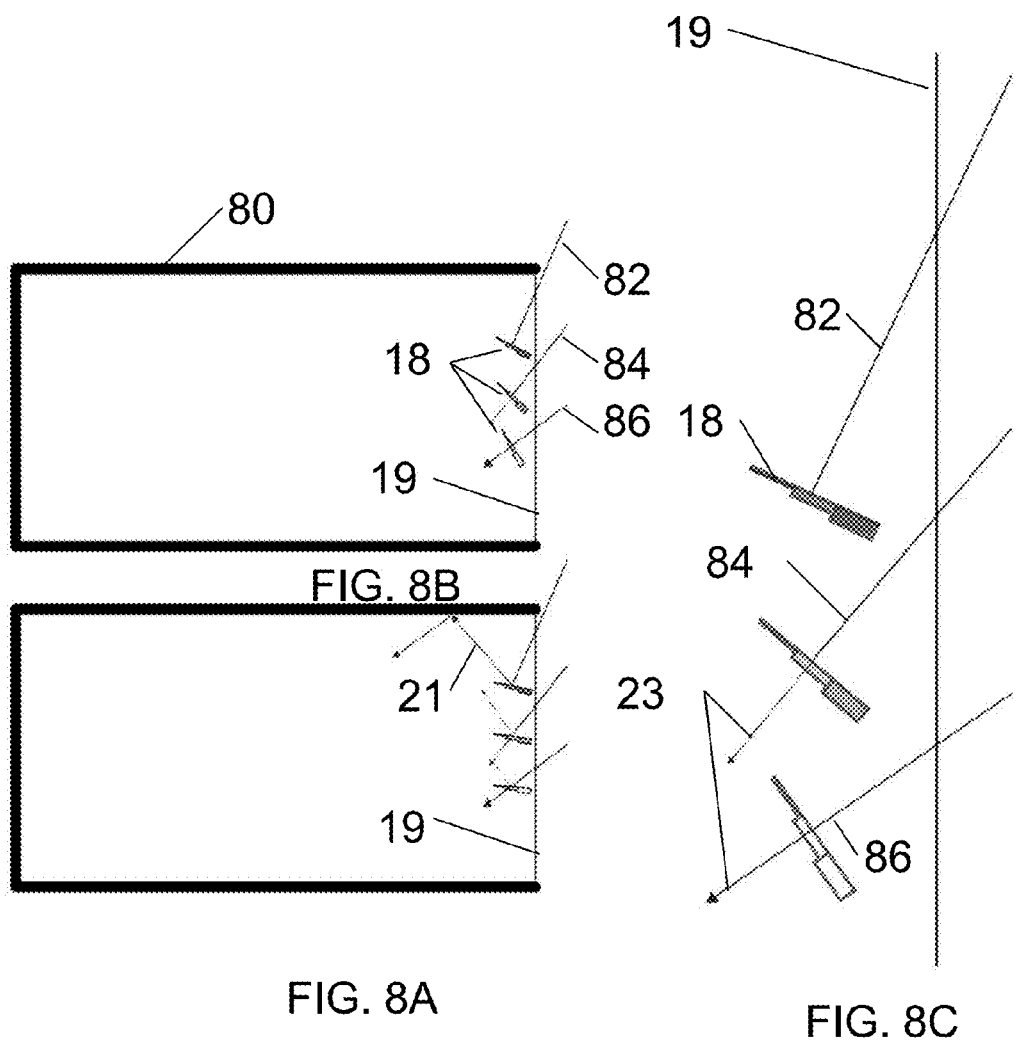

DEVICES FOR MODULATION OF TEMPERATURE AND LIGHT BASED ON PHASE CHANGE MATERIALS

CROSS-REFERENCE TO RELATED APPLICATIONS

This application claims priority to U.S. Provisional Application Ser. No. 61/848,901, titled DEVICES FOR MODULATION OF TEMPERATURE VARIATION BASED ON PHASE CHANGE MATERIALS, filed Jan. 14, 2013, incorporated by reference herein in its entirety.

FIELD OF THE INVENTION

This invention relates to the use of phase change materials to modulate temperature variation in interior environments. In particular, this invention relates to incorporating phase change materials in containment vessels that promote and control conduction of thermal energy between the phase change materials within the containment vessels and the surrounding air.

BACKGROUND OF THE INVENTION

The term 'phase change materials' (PCMs) refers to substances with a high heat of fusion which, melting and solidifying at a certain temperature, is capable of storing and releasing large amounts of energy. Heat is absorbed or released when the material changes from solid to liquid and vice versa; thus, PCMs are classified as latent heat storage (LHS) units.

PCM's latent heat storage can be achieved through solid-solid, solid-liquid, solid-gas and liquid-gas phase change. However, the only phase change used for PCMs is the solid-liquid change.

Initially, the solid-liquid PCMs behave like sensible heat storage (SHS) materials; their temperature rises as they absorb heat. Unlike conventional SHS, however, when PCMs reach the temperature at which they change phase (their melting temperature commonly referred to as the 'set point') they absorb large amounts of heat at an almost constant temperature. The PCM continues to absorb heat without a significant rise in temperature until all the material is transformed to the liquid phase. When the ambient temperature around the liquid PCM falls, the PCM solidifies, releasing its stored latent heat.

A large number of PCMs are commercially available in any required temperature range from −5 up to 190° C. Within the human comfort range between 20-30° C., some PCMs are very effective at stabilizing daily internal temperature fluctuations. PCMs store 5 to 14 times more heat per unit volume than conventional storage materials such as water, masonry or stone. One application for PCMs is their use in buildings to modulate temperature variations, and thereby reduce energy consumption, or to shift energy consumption to off-peak load times. In such applications, the PCMs are generally placed out of view, such as within the wall cavity or in the ceiling. Such placement reduces the exposure of the PCM to air flow within the living/working space, and also hides the operation and functionality of the PCMs from the building occupants. One aspect of the present invention is therefore to describe devices for containment of PCMs that are designed to be directly exposed to air flow. Another aspect of the present invention is to describe devices for containment of PCMs that are designed to enable building occupants to be visually aware of the operations and functionality of the PCMs such that occupants can reconfigure them for more effective internal temperature stabilization. Yet another aspect of the invention is to provide a variety of stand-alone systems (not integrally connected to building infrastructure) that enable building occupants to vary the distribution and set point (freeze/melt) of PCM within room based on their experience of thermal comfort and the visual cues enabled by the device design.

SUMMARY OF THE INVENTION

The present invention are devices that incorporate phase change materials in containment vessels that promote conduction of thermal energy between the phase change materials within the containment vessels and the surrounding air. In some embodiments, the containers are transparent to enable visual awareness of the operation and functionality of the PCMs. In some embodiments, the containers are designed to passively promote airflow across the surfaces of the containers. In some embodiments, the containers include structures to promote the conduction of thermal energy to and from the interior of the container. In some of these embodiments the container exhibits control over PCM crystal growth by providing thermal 'seeds.' In some embodiments, PCM is easily re-locatable within a building interior.

BRIEF DESCRIPTION OF THE DRAWINGS

Embodiments of the present invention will now be described, by way of example only, with reference to the accompanying drawings for the purpose of illustrating the embodiments, and not for purposes of limiting the invention, wherein:

FIGS. 2A, 2B, and 2C show a time-lapse example of a PCM undergoing crystallization while changing from liquid phase to a solid phase material;

FIGS. 6, 6A, 6B, and 6C illustrate a stand-alone PCM system with a fan and venture container to induce airflow;

FIGS. 8A-C schematic representations of other examples of PCM containers that are reconfigurable within occupied space.

DETAILED DESCRIPTION OF THE INVENTION

Figure 1:
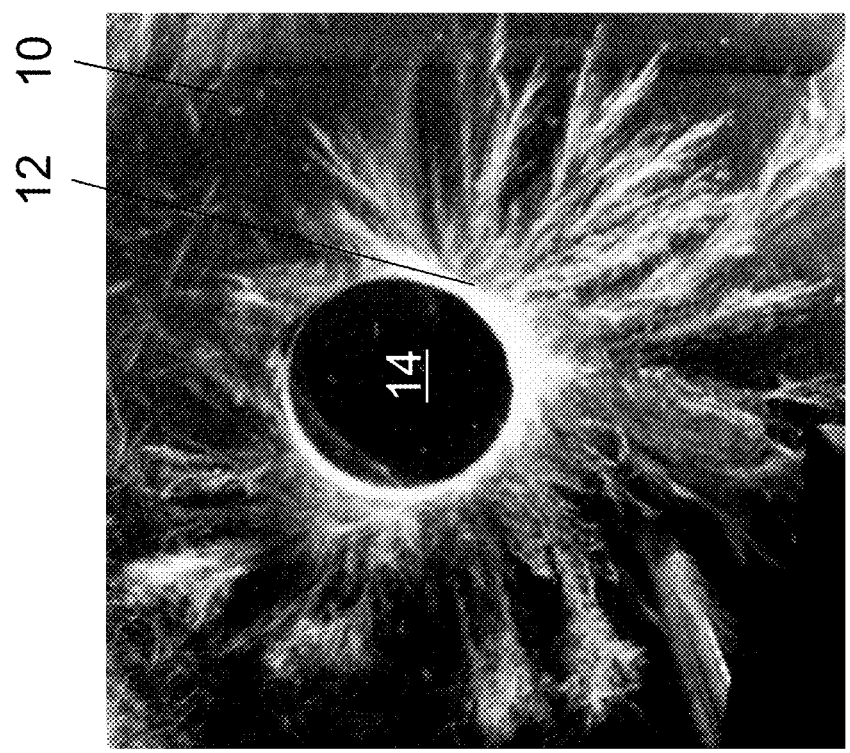
FIG. 1 shows an example of a PCM undergoing crystallization while changing from liquid phase to a solid phase material, the clear portions is a seed initiation site.

In the present invention, phase change materials (PCMs) are enclosed in containers that are directly exposed to the air in the interior of a building. A variety of PCMs are known to those skilled in the art. In a preferred embodiment, fatty acid based PCMs are used to avoid toxicity or flammability issues associated with many other PCM materials. Despite these advantages, organic PCM has a relatively low thermal conductivity (Thermal Conductivity ~0.2 W/m/K). The present invention increases thermal conductivity of PCM with relatively low thermal conductivity. The present invention makes PCM more effective by packaging the material in containers with high surface to area ratios and supplying thermal bridging from the exterior of the container to the interior of the container. For example, using mesh of aluminum (conductivity of 160 W/m$^2$C) at 1% volume would increase the overall conductivity to about 1.6 W/m2C, which is a factor of eight of PCM. If the mesh wire has a diameter of 0.5 mm, for a PCM volume of 1 cm3, the resulting length of the tangling wires is 5 cm, the surface to volume ratio is 78 cm-1, and the lateral spacing of wires in the mesh is 4 mm, which gives very homogeneous enhancement of the conductivity in the PCM. Generally, a small wire spacing of up to 5 mm is desirable for the homogeneous enhancement of conductivity. However, the present invention is capable of functioning with inorganic PCMs as well. The mesh, 2-dimensional or 3-dimensional, should be able to sustain its positioning in both liquid and solid states. It could be connected to interior wall of the container or interconnected to be self-supporting. Mesh could be constructed by conventional means of manufacturing processes such as weaving, welding, stamping or strand or strands coiled or packed into the container. In one embodiment (not shown) of the conductive material can include one or more single strands that are not intentionally interconnected or intertwined. Each strand must be sufficiently rigid such that it does not collapse due to gravity and collect on the bottom of the container while the PCM is in its liquid state.

A variety of formulations of PCMs are known to those skilled in the art to enable control of the freeze/melt point. In a preferred embodiment for building applications for human occupancy, formulations of PCMs are made to set the temperature for the phase change to be in the range of temperatures for human comfort, such as within the range of 18° C. to 24° C. In some embodiments, the target temperature for phase change may be selected to be in a different range depending on the climate conditions in which the device will be placed—e.g. to emphasize maintaining a cooler temperature in hot climates, or a warmer temperature in cooler climates. In some applications, the formulations of PCMs may be made based on a desire to maintain temperatures in a range selected for some other purpose than human comfort, for example to maintain an optimal temperature range for operation of computing equipment. Target set temperatures may be specified during the material formation process. Common temperature set points for interior applications range from 23° C.-29° C. PCM is available commercially in a variety of forms from a variety of vendors such as Phase Change Energy Solutions, Energy Efficient Systems and others. Forms of PCM include inorganic materials that are salt-based and organic materials that are composed of paraffin or fatty acids.

Figures 3A, 3B, 3C:
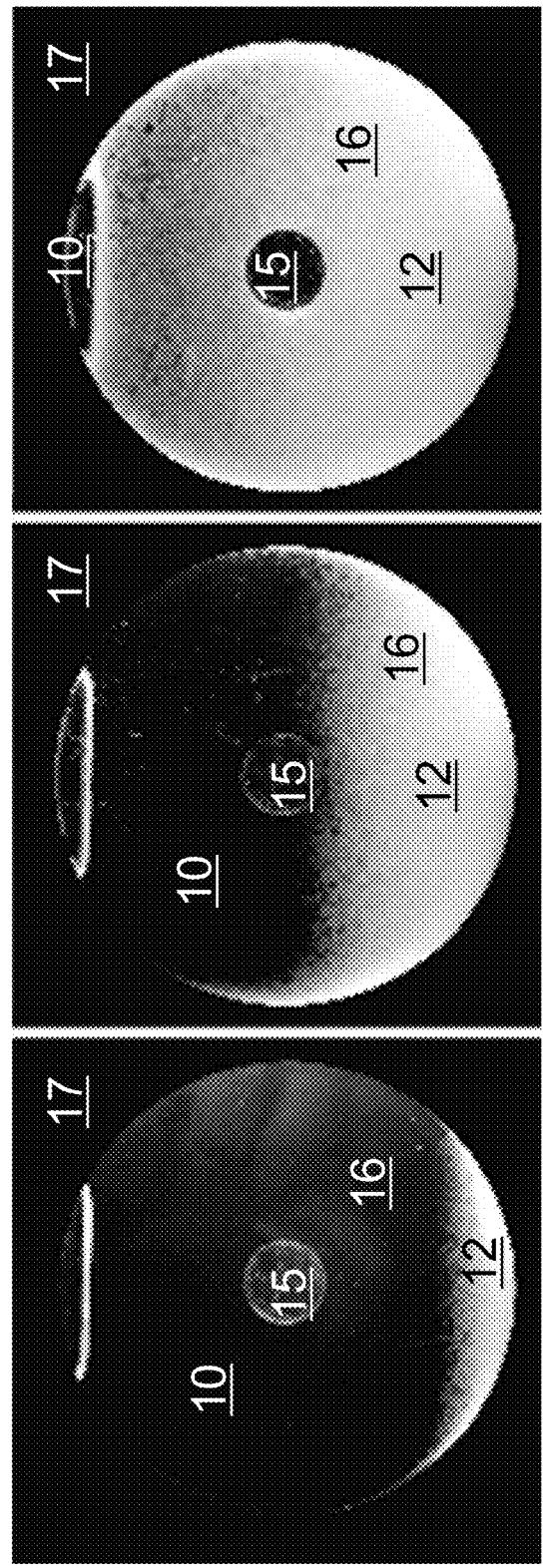
FIGS. 3A, 3B, and 3C show an example of a device according to the present invention in which the phase change from liquid phase (dark) to solid phase (white) visibly occurs.

In one embodiment of the present invention, the PCMs are enclosed in containment vessels that are transparent. The transparency enables building occupants to observe the operation and functionality of the PCMs, as shown in FIGS. 1-3. The transparent container, together with the potential to move the containers according to the daily changing thermal spectrum within a building, enable building occupants to reconfigure the PCM containers for better thermodynamic effect. FIG. 1 shows an example of a PCM undergoing crystallization while changing from liquid phase 10 (dark portion) to a solid phase material (white portion 12), the circular clear portions 14 are seed initiation sites made of a material of higher thermal conductivity (glass) than the surrounding container (acrylic). FIGS. 2A, 2B, and 2C show a time-lapse example (3 time points) of a PCM undergoing crystallization while changing from liquid phase material 10 (dark portion) to a solid phase material 12 (white portion). FIG. 2A is mostly liquid phase material 10. FIG. 2B is a mix of liquid phase material 10 and solid phase material 12. FIG. 2C is mostly solid phase material 12. FIGS. 3A, 3B, and 3C illustrate a 5 mm interlayer of PCM that was heated prior to being poured into the container. The operating depth of PCM in the tiles range from 1 mm-50 mm. Organic PCM, Specific Heat 197 kJ/kg, Melting Point 29 C, in a clear acrylic container 16 designed to show phase transition from liquid phase material 10 to solid phase material 12. In this instance the circular disc 15 in the center of the tile is composed of a material with the same thermal conductivity as the container and does not serve as a seed nucleation site, the disc forms a clear window within the container, allowing light to pass through. The photographs are taken with a black background 17 as the material in its liquid state is clear. Transparent containment vessels 16 can be fabricated from a variety of materials known to those skilled in the art, such as polypropylene, polycarbonates, acrylics, or glass. The containment vessels 16 can be fabricated by a variety of means known to those skilled in the art, such as blow molding, injection molding, lost core molding processes or printed via rapid prototyping techniques.

Figure 3D:
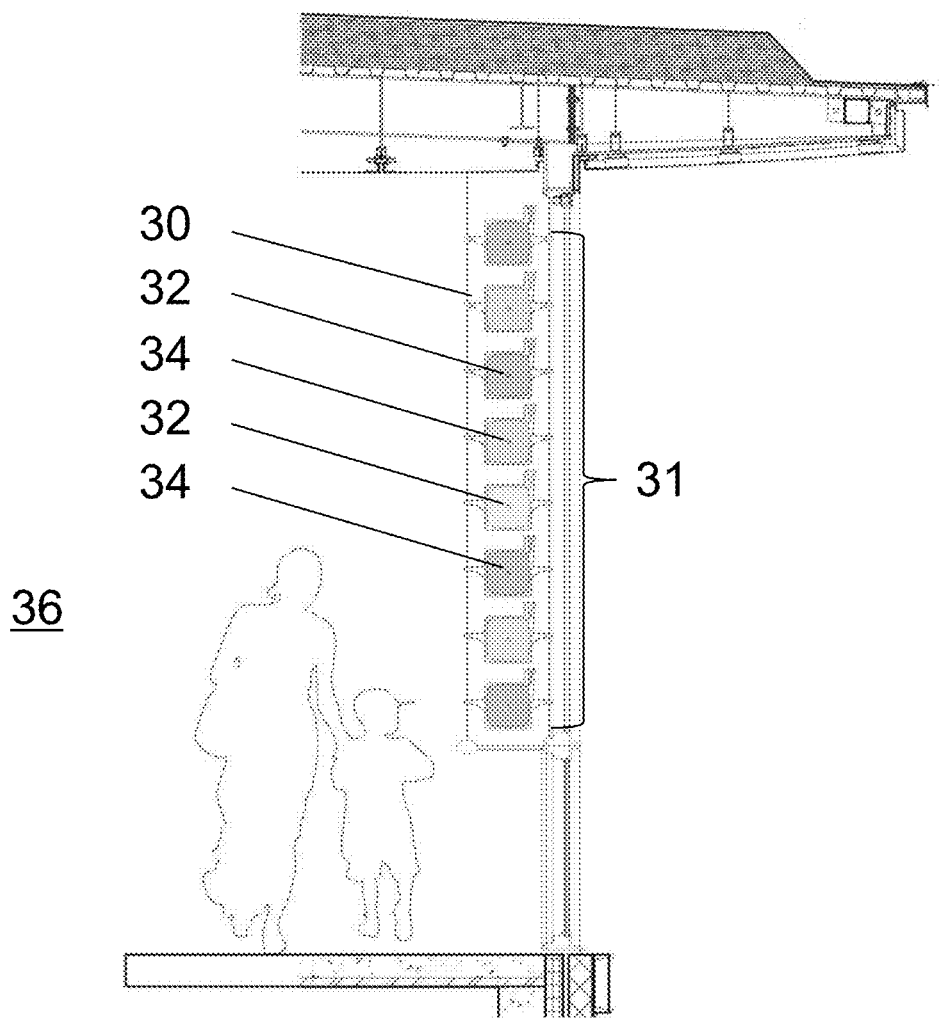
FIG. 3D shows a schematic representation of PCM containers that are reconfigurable within occupied space.

Now turning to FIG. 3D that shows an embodiment that can be reconfigurable by the building occupant. The PCM containers 31 are hung from a cable mounting system 30 such that the containers 32, 34 can be moved vertically (or horizontally) to differing thermal spectrums within the building interior 36. The containers 32, 34 shown are filled with two different set points of PCM: container 32 contains PCM with a set point of 20° C., and container 34 contains PCM with a set point of 21° C. A building occupant can monitor PCM location effectiveness as a result of the transparent container as when PCM is in transition it is at its most effective state. The transparent container makes this easily detected.

Figure 4A:
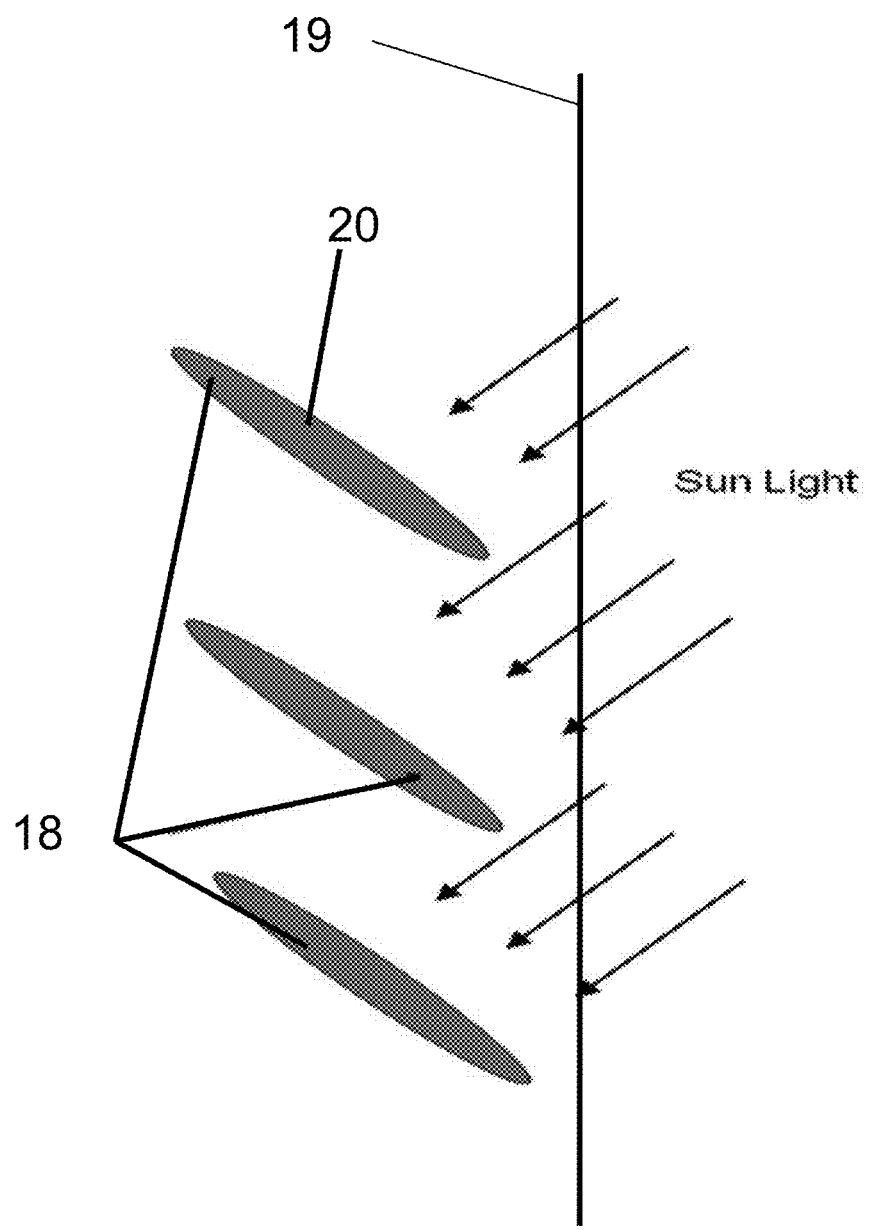
FIGS. 4A-F show schematic representations of devices according to the present invention that are designed as louvers, some shaped to facilitate airflow/thermal transfer and others having embedded conductive mesh.
Figures 4B, 4C:
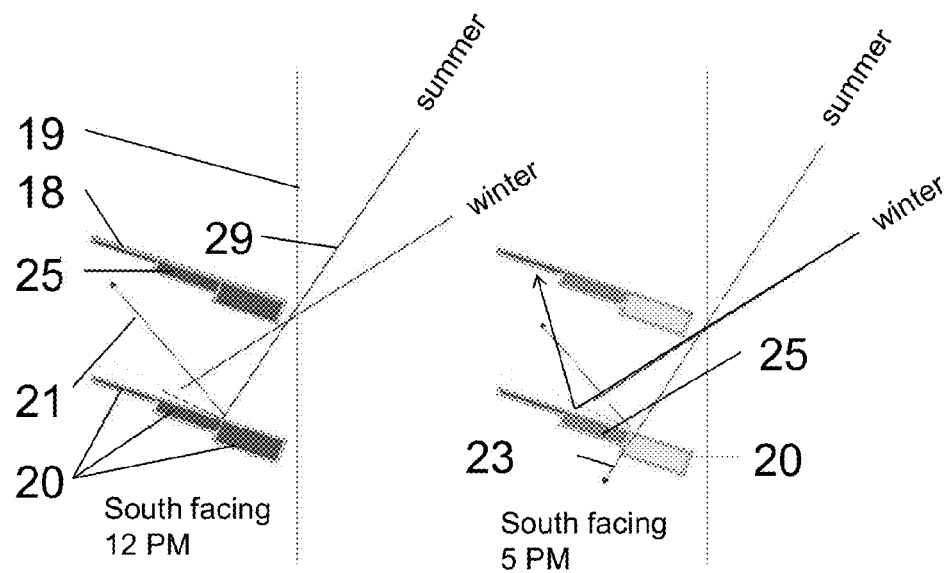
Figures 4D, 4E:
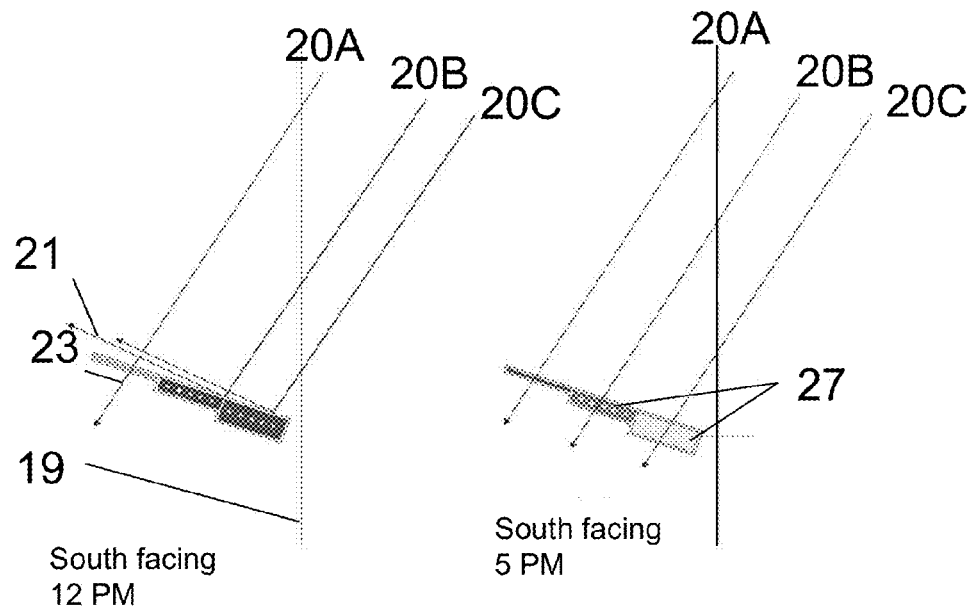

In some embodiments of the present invention, the containers are designed to serve additional functions besides temperature modulators. For example, the containment vessels could also function as louvers 18 on windows to control the amount of light 29 entering the interior of the building through the window 19, as shown schematically in FIGS. 4A-F. FIG. 4A is a schematic arrangement of louvers 18 containing PCM 25 to designed to modulate light and increase natural convection. Louvers 18 can be interconnected by conventional mechanical or electrical devices (not shown) such that the louvers 18 can move independently or individually of the other louvers 18 or to move in concert together. The volume of the louver 18 or cells 20 in louver 18 is/are sized (in conjunction with proper material set point of PCM 25) to maintain a layer of PCM (1 mm-50 mm) in its frozen state to reflect light 21 during periods of intense solar insolation. The volume of PCM 25 is designed per latitude, exterior temperature profiles, and interior temperature set points. For example, volume 20A is 5 cm depth, 1 hour for full light transmission; volume 20B is 1 cm depth, 2 hours for full light transmission; and volume 20C is 1.5 cm depth, 3 hours for full light transmission. This embodiment enables the PCM 25 to be used as a light reflector by overcoming the PCM property to melt when absorbing solar radiation, becoming clear and allowing light 23 to pass through. Louvers 18 are operable to increase or decrease thermal absorption capacity. For example, at Pittsburgh in April, a south facing single glass window 19 with conductive heat loss to ambient will receive 1.76 KWh/m$^2$/day energy. A typical PCM of 2 cm thickness will take about 6 hours to totally melt. Before melt, the PCM could also reflect light 21 back to ambient while melting. Mesh 27 can be included within PCM 25.

Figure 4F:
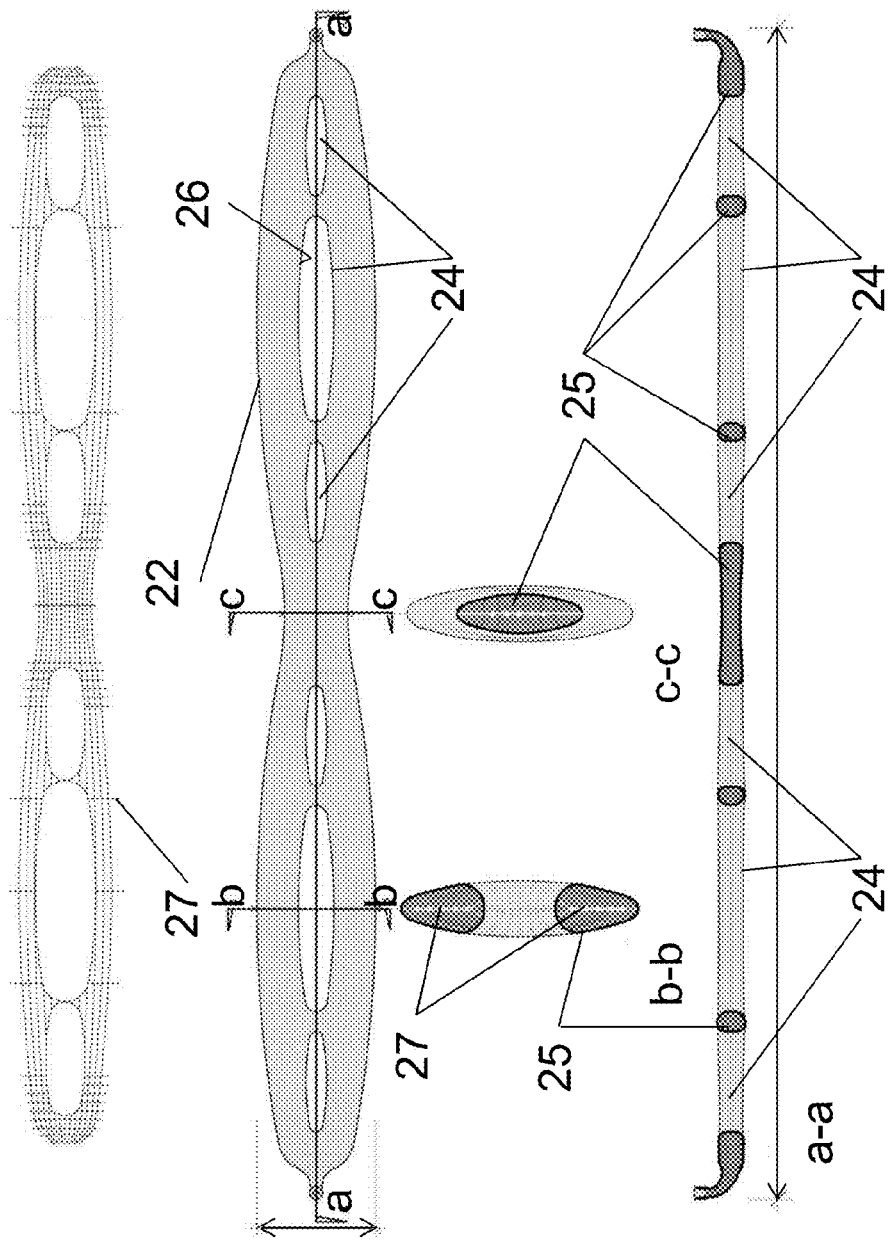
Figure 5:
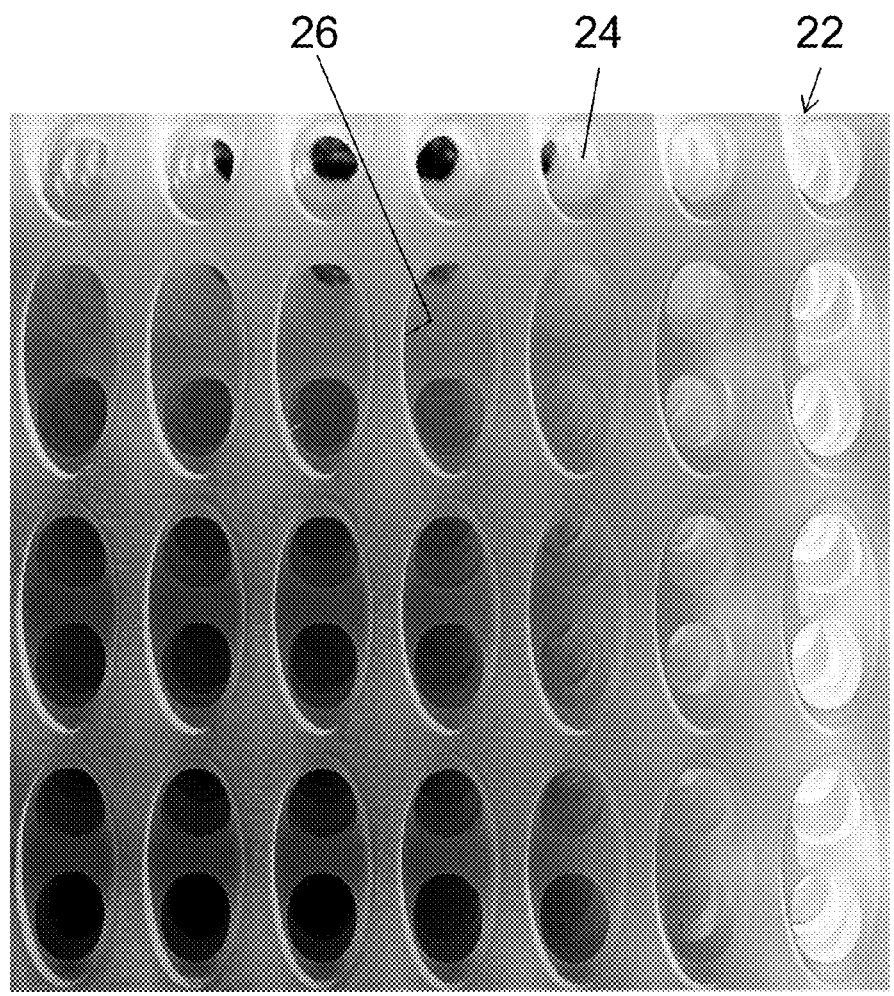
FIG. 5 shows an example of a device according to the present invention with a honeycomb structure designed to promote air flow across large surface areas of containment vessels of PCMs.

Now turning to FIGS. 4F and 5, some containers embodiments of the present invention are designed to promote airflow across the surface area 26 of the container 22 containing PCM 25 and conductive material 27 (e.g., mesh or wire strands). For example, the container 22 can be constructed with one or more apertures 24 by which induces airflow as a result of foil shape and temperature difference between PCM 25 and the surrounding air. FIG. 5 illustrates a three-dimensional network, such as a 'honeycomb' configuration, designed to effectively distribute PCM for air contact and thermal transfer. The 'solid' or hollow monolithic material is a thin walled container intended as a container 22 to hold PCM 25 in specific geometries. The holes 24 are designed to facilitate air-flow and thermal transfer rates as discussed above. Micro structures such as grooves or fins (not shown) on the exterior surface area 26 of the containment vessel 22 increase surface area exposed to air to increase thermal transfer rates.

Figure 6:
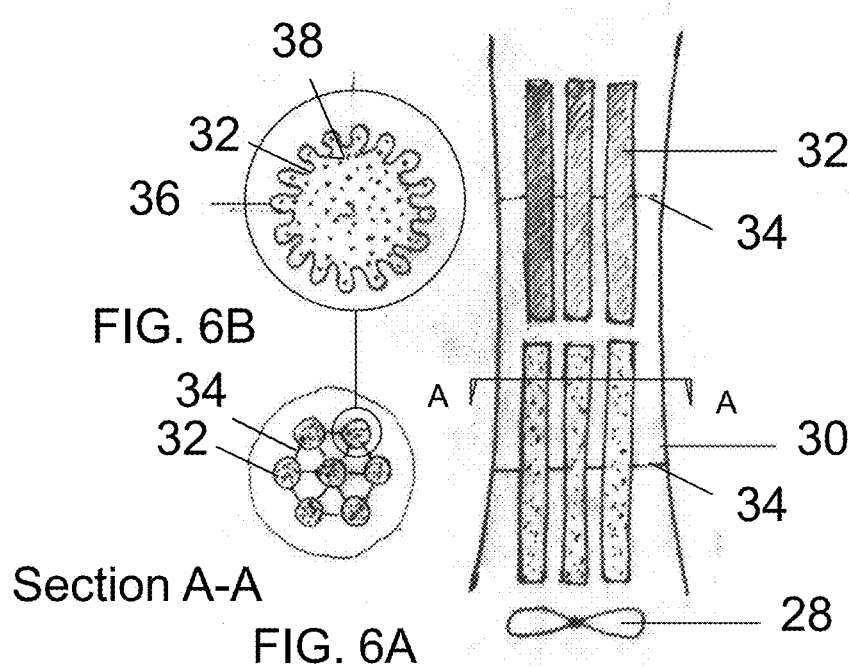
Figure 6C:
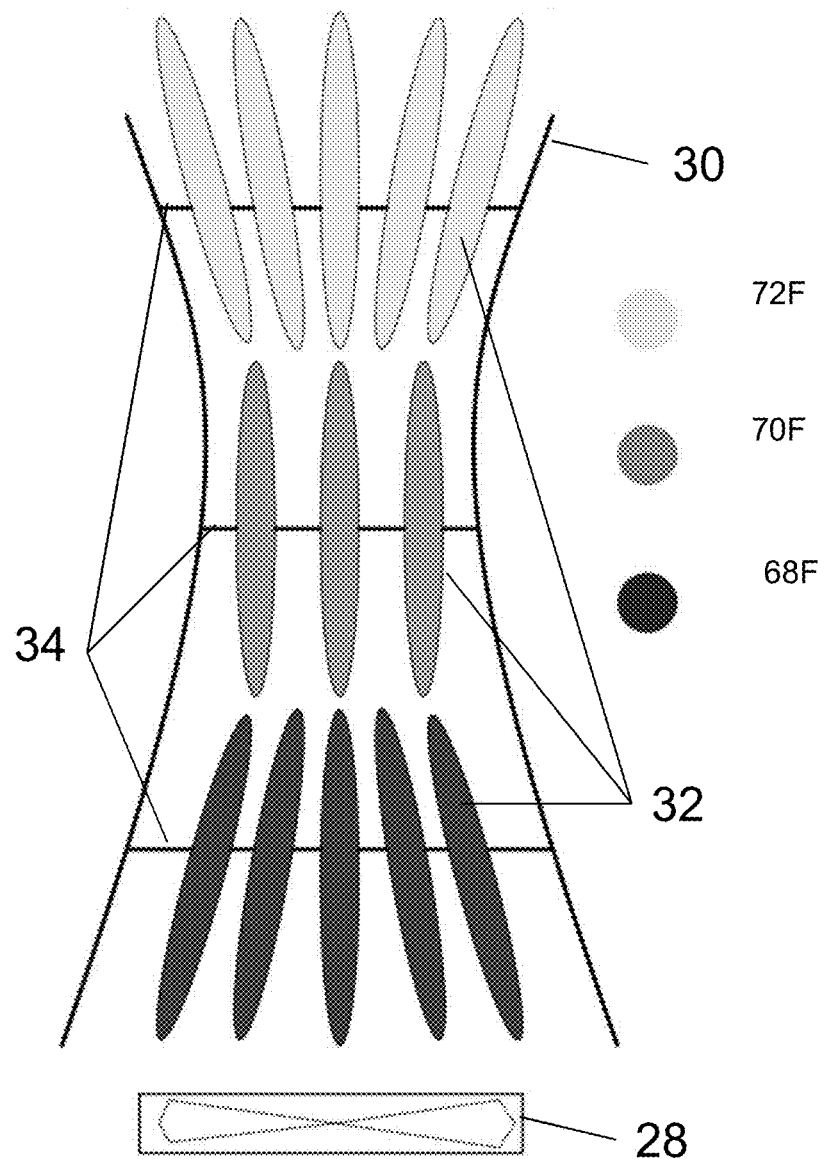

In some embodiments of the present invention, the containment vessels are designed to increase natural airflow. Those skilled in the art are aware of a variety of design configurations that could be used to increase air flow, such as venture tube type of vessel, as shown in FIG. 6, or airfoil designs of the PCM container shown in FIG. 6C. The intended outcome is to reduce the entrance contraction and exit expansion loss of the airflow that higher flow rate can be achieved at natural convection. FIGS. 6 and 6C illustrate examples of stand-alone PCM systems with a fan 28 and venturi vessel 30 to induce airflow. The interior PCM containers 32 are reconfigurable to optimize material set points for specific room conditioning requirements. FIG. 6A is Section A-A that illustrates an arrangement of a plurality of interior PCM containers 32 interconnected with tethers 34 to maintain the desired arrangement. Interior PCM containers 32 can be removable and be changed seasonally, or changed with occupancy, or when the stand-alone system is moved to a room with different thermal requirements. FIG. 6B is a magnification of one interior PCM container 32 shown in FIG. 6A, which illustrates a discontinuity 36 (such as a protrusion or an extension or a bulge or a microgroove) on the inner surface 38 thereby adding surface area to the PCM container 38. PCM containers 32 shown in FIG. 6C are shaded to illustrated that the PCM containers can be filled with PCM of different set points: dark—set point of 68° F.; medium—set point of 70° F.; and light—set point of 72° F. The invention is not limited to these three set points. The user can determine which PCM containers 32 to select to modulate and control the temperature environment of the room. Scale of the system may be varied to an individual room or a larger atrium space. The interior of the stand-alone system may also be configured with three-dimensional PCM networks as shown in FIG. 5.

As discussed above, some embodiments of the present invention incorporate "seeding" with structures of conductive materials placed or embedded inside of the PCM containers 32 (FIG. 6) to initiate crystal growth and promote and control the conduction of heat into and out of PCMs that are located in the interior of containers. Those skilled in the art are aware of a wide variety of conducting materials and configurations that could be used for this purpose. Any material with high thermal conductivity, such as, aluminum, copper, tantalum or graphite may be used.

Figure 7A:
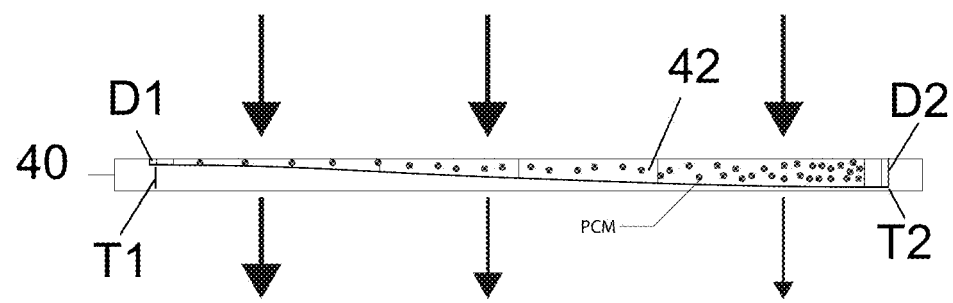
FIGS. 7A and 7B illustrate containers of the present invention showing differentiation in PCM thickness and light transmission in terms of duration.
Figure 7B:
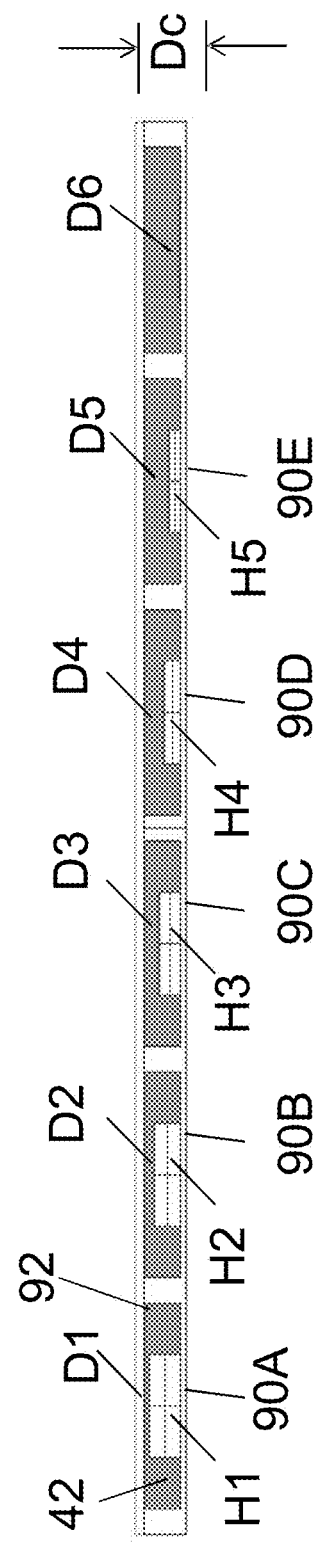

Now turning to FIGS. 7A and 7B illustrating containers 40 having a varying back side thickness from thick T1 to thin T2 or internal structures 90 with varying heights that cause varying internal depth of PCM 25 from small D1 to large D2/D6 of the volume 42 to contain the PCM 25. In some embodiments the containers may be designed to direct crystal growth through variations in the container thickness, effecting thermal transfer rates from interior to exterior. In this way the containers display controlled visual performance of PCMs shifting from liquid to solid phase and can be made variable to effect transmission of reflectance of sunlight. Differing wall thickness will effect thermal rates and enable targeting of crystallization points within the container. In FIG. 7B there are illustrated six cells 92. Within each cell 92 can be an internal structure 90A-90E having varying heights H1-H5 that cause varying depths D1-D5 or no structure that yields a depth D6 equal to the depth of the cell Dc: where the depth of PCM layer is cell depth Dc minus structure height H.

In some embodiments variation in the container's thickness allows control of visual output when PCMs are in crystal form. In this way containers may modulate sunlight, from near zero transmission (near total reflectance) to near full transmission (near zero reflectance), while continuing to provide thermal storage. For instance, a shaped louver (FIGS. 4A-F) will vary light transmission over the course of the day. The leading edge will melt more quickly and become more transparent than the trailing edge. In this way light transmission can be controlled via container configuration and PCM volume. As discussed above, FIGS. 4B-E and 7A-B illustrate containers of the present invention showing differentiation in PCM thickness and light transmission in terms of duration. Less light passes through the thicker area (or internal distance within the containment vessel) and the timing of light transmission can be controlled. For example, light will not pass through the thicker area until the PCM has absorbed a target amount of thermal energy. This embodiment is divided into separate cells 20 to avoid thermal convection from cell to cell. In this design the upper layer of glass is of constant thickness and the lower layer is variable. In this instance light transmission is a function of PCM material thickness.

Now turning to FIGS. 8A-C to illustrate exemplary architectural designs that address the need for natural light. This is an especially complex problem when designing deep rooms 80 (rooms more than 20' from a window) that would benefit from even lighting. A common solution is to implement louvers 18 (discussed above) and light shelves that bounce light deep into a space. Generally the reflectivity of the louver 18 is known and reflection 21 can be calculated. The present invention enables light reflective PCM to be dynamic and over time (with thermal absorption) allows an increasing amount of light transmission 23. The louver 18 can be 'tuned' to specific orientations, latitudes and microclimates to find a balance between thermal energy storage/release, light reflection 21 and light transmission 23 with reference to material thickness (see volumes 20A, 20B, 20C of FIGS. 4B-E) within the louver 18. This invention further increases the usefulness of PCMs by providing variable illumination and thereby reducing lighting energy costs by utilizing incoming natural light more effectively. FIG. 8C shows an enlarged version of a possible louver configuration, where sun light 82 contacts window 19 at an angle occurring at 12 PM on a summer day; sun light 84 contacts window 19 at an angle occurring at 2 PM on the same summer day; and sun light 86 contacts window 19 at an angle occurring at 4 PM on the same summer day.

The phase change of PCM usually occurs in a range between the melt-start and melt-complete states. At the melt-start and melt-complete conditions, the transmissivities of light (a value between 0 to 1) are that of solid, $T_s$, and liquid, $T_1$, respectively. The process takes a total latent heat $H_{s1}$ (kJ/kg) to complete the melting. Consider a constant solar heating applied at a heat flux of q (kW/m²) over time s (second) on a PCM of thickness d (m) and density r (kg/m³). Let the melting starts at the time zero. Up to any time, the extent of heat contributed to melting is H (kJ/kg) can be evaluated as $$qs = rdH \qquad (1)$$

Assuming the change of the transmissivity is linear between the solid and liquid states, the momentary transmissivity T can be related with the extent the total latent heat is reached, $$T = T_s + (T_1 - T_s)(H/H_{s1}) \qquad (2)$$

Eliminate H from these two equations, the momentary transmissivity becomes $$T = T_s + (T_1 - T_s)(qs/rdH_{s1}) \qquad (3)$$

This gives the momentary transmissivity of light, T, as a function of PCM thickness, d, and time, s, if the heat flux is known.

With the present invention, architects can tailor PCM systems to meet both energy balance needs and illumination requirements according to the equation above. The louver has three states: 1) PCM solid—transmissivity low—approximately 0.1, 2) PCM molten state—near transparent—0.7-0.8, State 3—air—(this is a hole in the louver with full transmissivity). These three states together give the designer more control over light and thermal storage within a given space.

Figure 9:
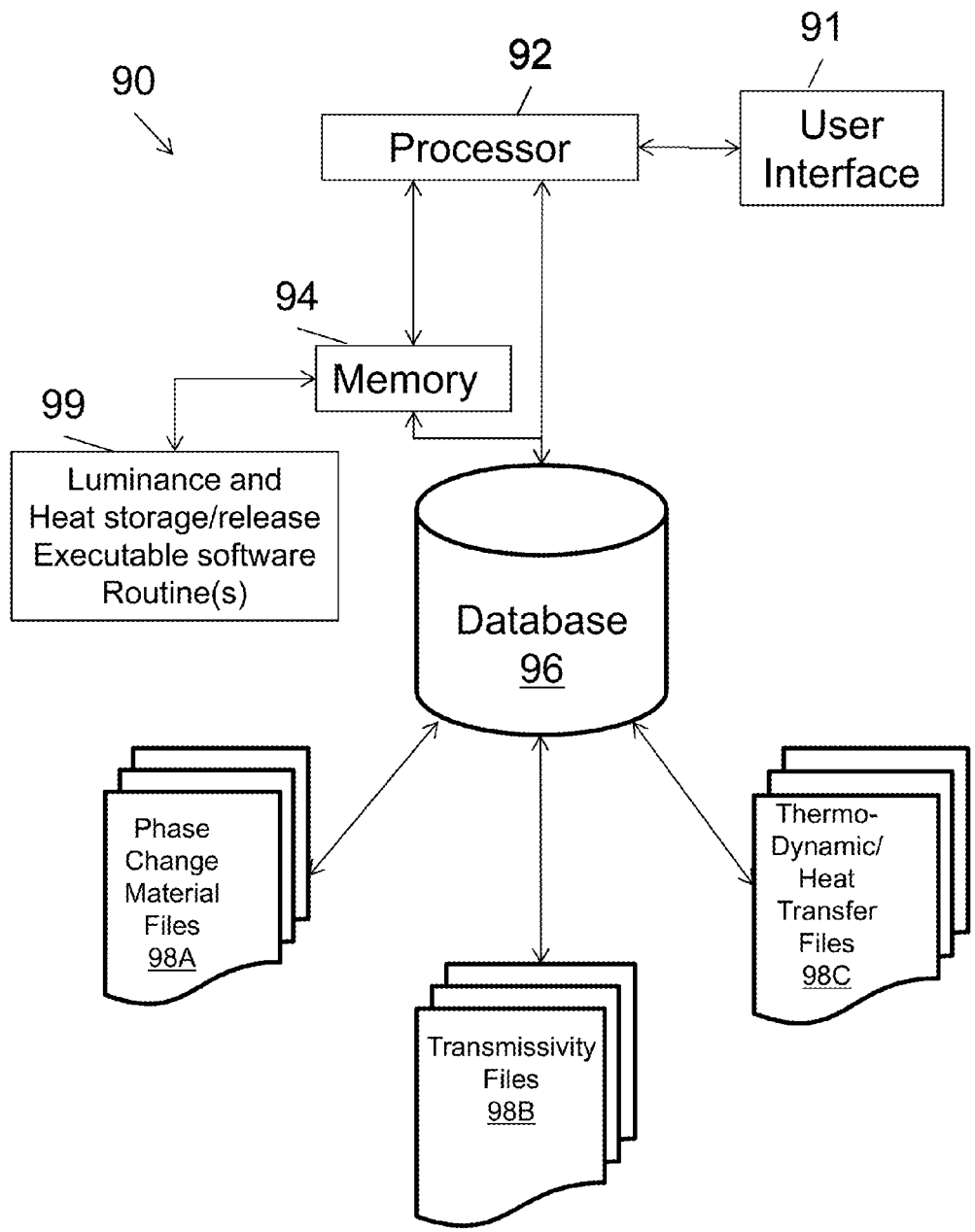
FIG. 9 is a schematic of a computer system and executable software of the present invention.

Now turning to FIG. 9 illustrating a computer system 90 that includes a processor 92 in communication with user interface 91, memory 94, and database 96. Memory 94 includes executable software 99 for performing the transmissivity calculations for luminance determination discussed above as well as the heat storage/release calculations. Database 96 includes phase change material files 98A, transmissivity files 98B, and thermodynamic and heat transfer files 98C. When the user inputs specific design criteria for a project that includes room size and latitude, processor 92 with execute the Luminance and Heat storage/release Executable software Routine(s) to pull necessary information (e.g., general data, standard engineering equations) from database 96 to determine, for example, one or more options for the type of PCM container (e.g., venturi tubes or louvers), overall container dimensions (e.g., number of cells, cell depths, cells length, target PCM set points). The executable routine is capable of running several iterations until the desire user specified interior space conditions are met within a user specified range (e.g., room temperature 68-74° F., 30-50 ft-candles).

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A device for modulation of temperature and illumination of an interior space comprising:
    a hollow containment vessel;
    phase change material disposed within the hollow containment vessel; and
    conductive material disposed within the phase change material,
    wherein the hollow containment vessel is transparent to permit light emission from the phase change material to exit the hollow containment vessel.

2. The device according to claim 1, wherein a material of the hollow containment vessel is selected from the group consisting of polypropylene, polycarbonates, acrylics, and glass.

3. The device according to claim 1, wherein the hollow containment vessel is a three-dimensional network.

4. The device according to claim 3, wherein the three-dimensional network is selected from the group consisting of architectural features, furniture, and fixtures.

5. The device according to claim 1, wherein the hollow containment vessel is a honeycomb configuration.

6. The device according to claim 1, wherein a form of the conductive material is selected from the group consisting of a single wire strand, a mesh of a plurality of wire strands, a plurality of interwoven wire strands, and a plurality of non-interwoven wire strands.

7. The device according to claim 1, wherein the hollow containment vessel comprises an internal depth sized to permit light to pass through the phase change material upon the absorption of a target amount of thermal energy by the phase change material.

8. The device according to claim 1, wherein the hollow containment vessel comprises one or more crystal growth seed initiation sites to display controlled visual performance of phase change material shifting from liquid to solid phase.

9. The device according to claim 8, wherein the one or more crystal growth seed initiation sites is an increased surface area of an exterior wall of the hollow containment vessel.

10. The device according to claim 9, wherein the exterior wall comprises discontinuities.

11. The device according to claim 10, wherein the discontinuities is one or more microgrooves on an exterior surface of the hollow containment vessel.

12. The device according to claim 8, wherein the one or more crystal growth seed initiation sites are one or more thermal bridges attached to an interior wall of the hollow containment vessel.

13. The device according to claim 1, wherein the conductive material is attached to an interior wall of the hollow containment vessel.

* * * * *